Oct. 25, 1966   R. E. JASPERSON   3,281,094
SELF-CONTAINED GUIDANCE SYSTEM
Filed April 16, 1962   5 Sheets-Sheet 1

INVENTOR.
ROBERT E. JASPERSON
BY
ATTORNEY

Oct. 25, 1966 R. E. JASPERSON 3,281,094
SELF-CONTAINED GUIDANCE SYSTEM
Filed April 16, 1962 5 Sheets-Sheet 2

INERTIAL PLATFORM CONTROL

INVENTOR.
ROBERT E. JASPERSON
BY
ATTORNEY

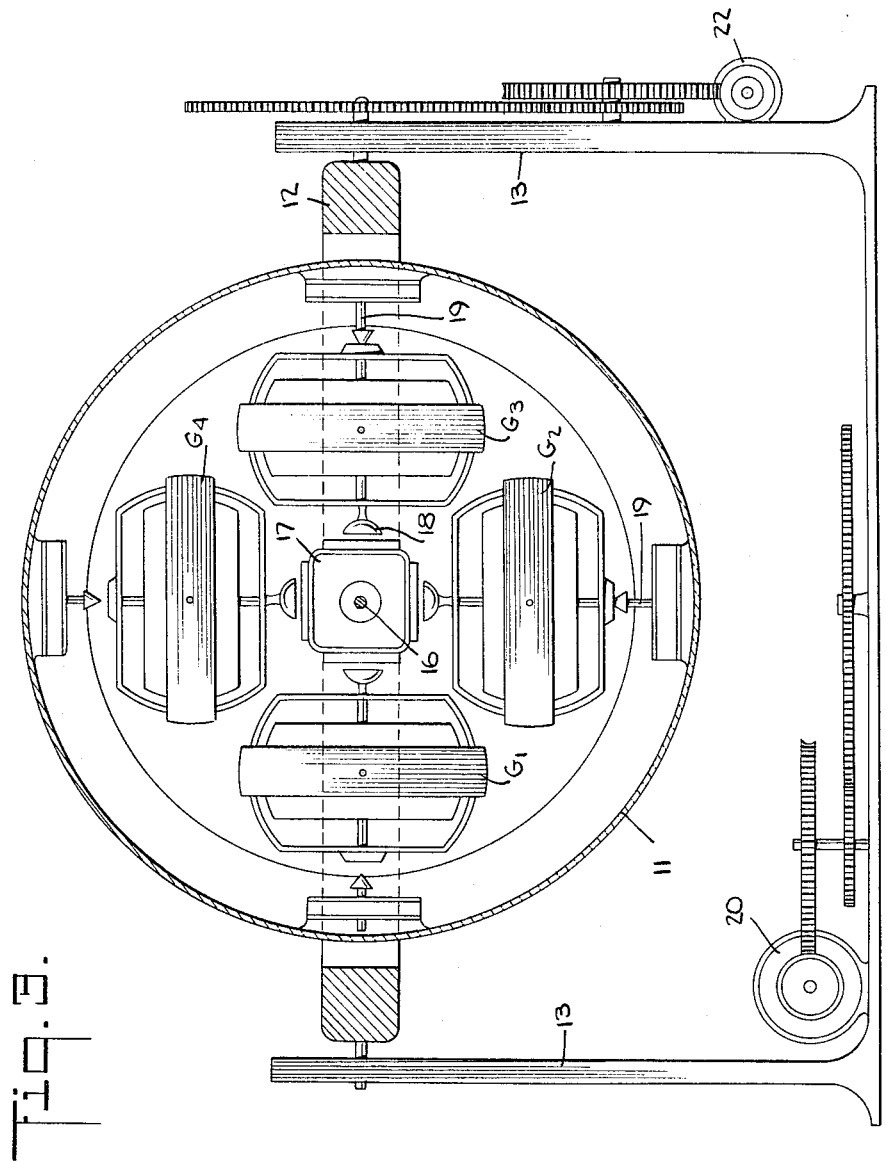

INVENTOR.
ROBERT E. JASPERSON

ATTORNEY

United States Patent Office 3,281,094
Patented Oct. 25, 1966

3,281,094
SELF-CONTAINED GUIDANCE SYSTEM
Robert E. Jasperson, Annapolis, Md., assignor to Trident Engineering Associates, Inc., Annapolis, Md., a corporation of Maryland
Filed Apr. 16, 1962, Ser. No. 187,675
7 Claims. (Cl. 244—14)

This invention relates generally to automatic guidance systems for vehicles, missiles, and the like; and more particularly to a self-contained inertial navigation system operating without external intelligence and adapted to assume control of a vehicle and to guide it accurately along a predetermined route to a final destination.

Inertial navigation is based upon the measurement of acceleration. This measurement is not directly applicable to the navigation problem which requires position or velocity data. However, since velocity is the first integral of acceleration and distance is the second integral, by integrating accelration twice the distance can be obtained. The values of velocity and distance are relative with respect to an initial starting velocity or starting point.

Acceleration may be sensed inertially by the use of accelerometers from which the values of velocity and distance are obtained by integration. Integration may be effected by devices external to the accelerometer. Many precision accelerometers are also designed so that their output is proportional to the first integral of acceleration, thereby yielding the velocity value. For inertial systems where distance information is required, instruments are commercially available yielding an output proportional to the second integral of acceleration, or displacement.

Measurements made by accelerometers must be carried out with respect to a stable system of reference. On the earth's surface this reference is the ground itself and generally no other reference is needed. But away from the earth's surface a stable platform is necessary in order to maintain a referencing system with fixed properties in space. This unit can be referenced to an other point in space, such as the center of the earth, or possibly the sun. These references, which are defined in terms of angular relationships, are ordinarily provided by gyroscopic devices.

In an inertial navigation system the measurements made by gyroscopes and accelerometers are coordinated with other components such as computers supplying navigational information to an autopilot or other course-correcting means. A major source of error in systems of this type arises by reason of gyro and accelerometer drift. While such errors can be reduced by the use of relatively-complex precision instruments of high cost, it has not been possible to rule out drift entirely. This problem becomes particularly acute in the case of compact instruments in which there is little room to include expedients for minimizing drift, to say nothing of the additional costs involved.

In general there are three sources of gyro drift, and these are essentially random in nature. A gyroscope is often dynamically unbalanced not only because of a lack of symmetry in its structure as manufactured, but also when subjected to changes in temperature or speed. Friction in the spin axis bearings also causes drift. Friction in the gimbal bearings results in lost energy and incorrect gimbal positions. Finally, energy is lost whenever a gimbal rotates because of the inertia of the gimbal; the greater the unbalance of the gimbal, the greater will be the drift from this source. Thus the line of direction of a gyro is not always in the direction in which theoretically it should point, this error, as indicated above, being due mainly to random inaccuracies.

Accelerometers and velocimeters are also subject to error. Accelerometers possess a threshold sensitivity which is the minimum acceleration input to the instrument required to produce a sensible output. The small threshold error of accelerometers is augmented by a drift rate error which can attain an untenably large value in a relatively brief period.

In view of the foregoing, it is the main object of this invention to provide an inertial guidance system of improved design which is capable of guiding a vehicle to its destination with a small degree of error as compared to existing systems.

More specifically, it is an object of this invention to provide a system combining an inertial platform and a horizontal platform, wherein the time-increasing drift of the accelerometers is prevented from going beyond acceptable limits and in which the adverse effects of gyro drift are reduced substantially by means of novel cycling and smoothing techniques.

A significant feature of the present invention is that markedly-improved performance of the inertial guidance system is obtained with gyros and accelerometers of standard commercial design, the combined inertial and horizontal platforms constituting a simple and highly-compact structure satisfying the most rigid space requirements.

The invention is applicable to automatic guidance systems for land, sea, air, or space vehicles and missiles. As applied, for example, to an unmanned winged vehicle, the system in accordance with the invention will take control of the vehicle upon its departure, guiding it along a predetermined route at various altitudes and finally to its destination, the system affording continuous and reliable position indications and trajectory maintenance without additional intelligence input and without the need to reference back to the launching site.

Briefly stated, these objects are accomplished in a terminal and enroute guidance system in which positional information is supplied to a computer that controls the course-directing mechanisms by an inertial platform containing free sensing gyros mounted above a stabilized horizontal platform, the direction of the local gravitational field being sensed by accelerometers.

In the inertial platform, at least two pairs of orthogonally-disposed gyros are provided, the control of the platform being switched sequentially from one pair to the other whenever a predetermined duty cycle time has elapsed or a relative gyro drift is detected, this being done by caging the then operative pair and uncaging the non-operative pair to take control of the platform.

In this manner, the accumulation of drift error is prevented and a constant drift rate is reduced to a number of small random drifts. Similarly, in the horizontal platform, at least two sets of orthogonally-arranged accelerometers are provided which are sequentially operated, so that the control of the platform is switched frequently to rezero the accelerometers and thereby minimize accelerometer drift.

For a better understanding of the invention as well as other objects and further features thereof, reference is made to the following detailed description to be read in conjunction with the accompanying drawing, wherein:

FIG. 3 is an end elevation of the inertial platform, partially in section, showing the arrangement of co-planar gyros to provide platform stability in space.

FIG. 8 is a plan view of a window in the top surface of a vehicle, showing a closed circuit television camera and its mounting.

*The inertial platform*

A complete navigational system for a vehicle comprises an inertial platform—an element stabilized with respect to but not necessarily with reference to the stars—a horizontal platform maintained normal to the direction of gravity, a computer, a programmed route, and an autopilot, the latter being constituted by whatever course-correcting mechanism the vehicle might possess. The inertial and horizontal platforms together furnish continuous position data. This positional information is combined periodically by the computer with the programmed position to generate a new true heading which is fed to the autopilot to make the appropriate adjustments in the course.

Figure 1:
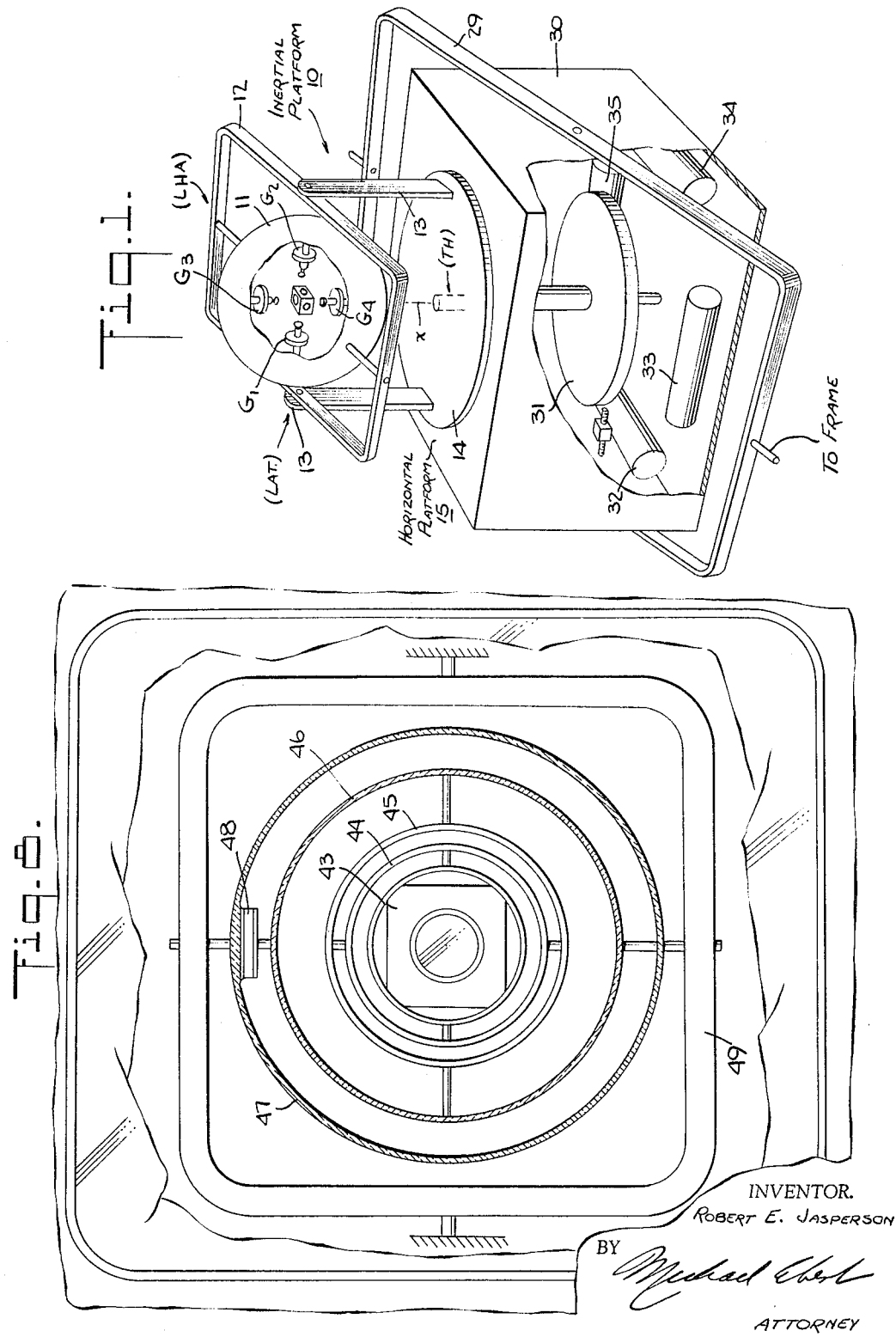
FIG. 1 shows schematically, in perspective, the combination of an inertial platform and a horizontally-stabilized platform in accordance with the invention.

Referring now to FIG. 1, we shall first consider the inertial platform in accordance with the invention, as shown schematically in this figure. This space-stabilized platform generally designated by numeral 10, is provided by a sphere 11, rotatably mounted in a gimbal 12, which in turn is rotatably supported by trunnions 13 fixed to a circular base 14. The base 14 is mounted upon the horizontal platform, generally designated by numeral 15, to be rotatable about the central spin axis $x$ of the gyro rotor therein. Thus three degrees of rotational freedom are provided. That is, the sphere is rotatable within gimbal 12 which is rotatable within the trunnions mounted on the circular base rotatable on the horizontal platform. Angular measurement at the bearings of gimbal 12 directly gives the local hour angle of the vernal equinox (LHA), angular measurement at the trunnions 13 supplies latitude (LAT), and angular measurement of the base relative to the axis $x$ gives the true heading (TH).

Mounted symmetrically within the sphere are four free low-drift gyros $G_1$, $G_2$, $G_3$ and $G_4$, gyros $G_1$ and $G_3$ being coaxially aligned along an axis perpendicular to the axes of coaxially aligned gyros $G_2$ and $G_4$. The symmetrical arrangement of the four gyros is not critical and they may be placed in a manner dictated by consideration of compactness for a particular type of gyro as long as their orthogonal orientation is maintained.

Figure 2:
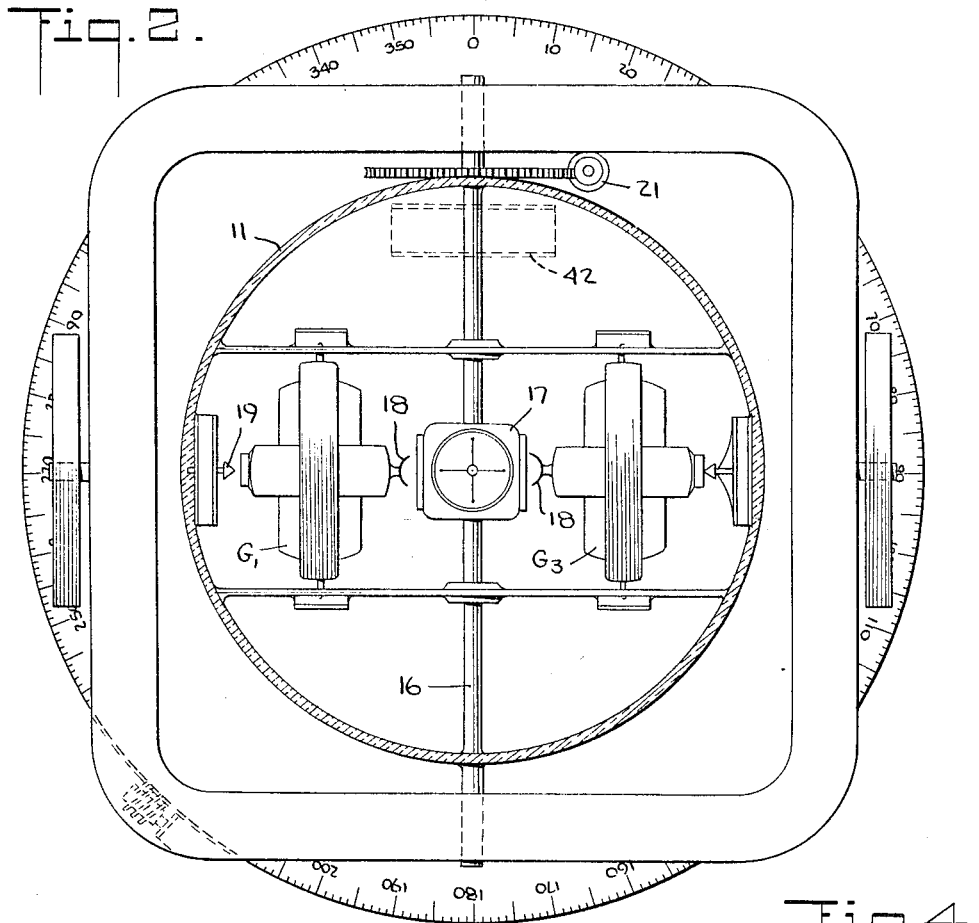
FIG. 2 is a plan view, partially in section, of the inertial platform supported in gimbals mounted upon a circular base rotatable about the central axis of the horizontal platform.

Referring now to FIGS. 2 and 3, the structure of the inertial platform is shown in greater detail. It will be seen that sphere 11 is mounted for rotation within gimbal 12 by a shaft 16 extending diametrically therethrough. The four gyros $G_1$, $G_2$, $G_3$, and $G_4$ are spaced equidistantly from the shaft, their outer suspension axes being parallel to each other.

Secured centrally to shaft 16 is a four-sided emitter-detector 17 containing a suitable light source. Attached to the spin axis gimbal of each gyro rotor is a hemispherical mirror 18. Projecting from each active side of the emitter-detector is a pencil beam whose rays impinge on the gyro mirror associated therewith, the rays being reflected back onto an array of detectors, preferably formed by photoelectric cells. If a symmetrical mounting of gyros is not used, each gyro must have a separate sensing element, such as the Perkin-Elmer "Optag."

The axis of a perfect free gyro will remain fixed in space. Hence two orthogonally-disposed gyros, such as $G_1$ and $G_2$ or $G_3$ and $G_4$, will ordinarily supply sufficient information to stabilize the inertial element. In the device described herein only one pair is effectively operative at any one time, the operation being alternated from one pair to the other for reasons to be set forth later.

Initially, and at rest, the four symmetrically-arranged gyros are in axial alignment with their associated light beams, thereby producing electrical signals of like intensity in the output of the emitter-detector. Such like signals are indicative of a null or "no error" condition. The displacement of the gyro positions as a consequence of platform tilt will cause misalignment of the reflected rays from the center of the detectors to generate "up-down" or "right-left" correction signals, depending on the direction and magnitude of the misalignment.

The four gyros are caged at their rest or aligned positions by means, for example, of four spring-loaded solenoid probes 19, attached to the inner wall of the sphere. The probes are normally urged outwardly to enter a rear socket in the associated gyro to cage same. When a solenoid is actuated, the probe is retracted from the socket to free the gyro.

Disregarding deviations due to rotor drift, when a given gyro is uncaged its rotor will remain fixed in space, whereas the sphere will be displaced in response to position changes. Therefore any displacement of sphere 11, such as that occasioned by a tilt of circular base 14, will give rise to a misalignment of the concave gyro reflector with the detector to produce an electrical output which is a function of the direction and extent of the displacement.

Thus shifts in platform position with respect to the axis of a gyro communicates a magnified motion to the light image to generate a platform error signal which is relayed via a rate regulator (to be later discussed) to be utilized to drive motors 20, 21 and 22. Motor 20 turns base 14 on axis $x$, motor 21 rotates shaft 16 of the sphere through a suitable gear train, while motor 22 serves to turn gimbal 12 on trunnions 13 also through a gear train. Hence the angular position of the base and the angular position of the sphere on its shaft 16 is adjusted, as well as the angular position of this shaft relative to base 14, these adjustments acting to annul the signals in the light detector when the detector is realigned with the gyro axis.

Accepting the fact that gyro rotor drift cannot be eliminated, but at best reduced to a few thousandths of an arc second per second by well known expedients, and further assuming that rotor drift errors are random rather than systematic in character, it will now be demonstrated that by a novel technique in accordance with the invention, the effects of drift can be reduced to an acceptable minimum.

Figure 4:
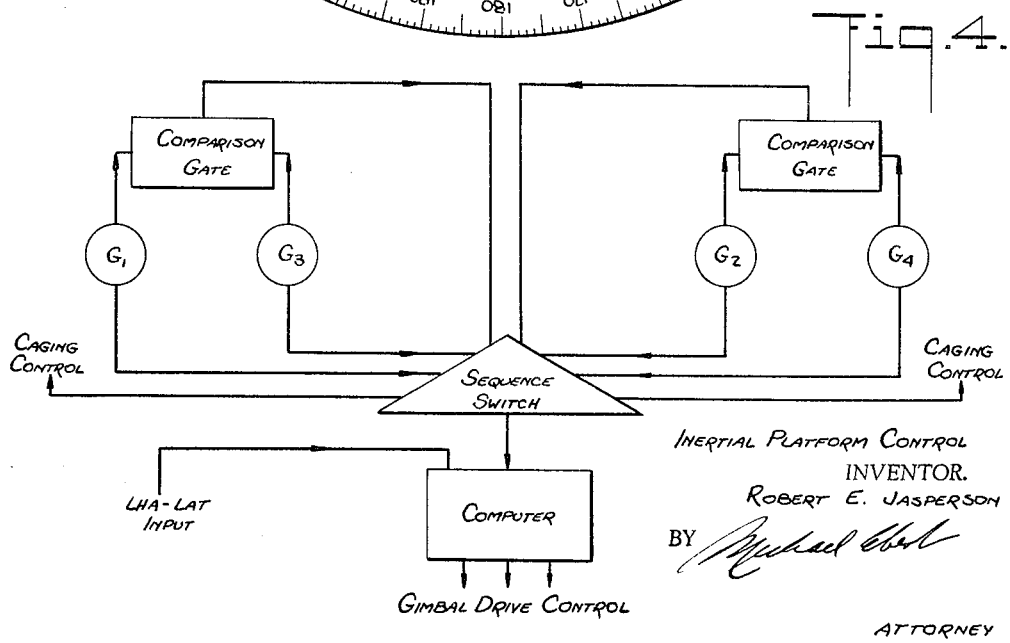
FIG. 4 is a diagram showing the flow of information and command signals controlling the inertial platform.

As noted previously, only one pair of orthogonal gyros is theoretically necessary to stabilize the inertial platform. Hence information supplied by pair $G_1$–$G_2$ would be adequate for this purpose, and that supplied by pair $G_3$–$G_4$ would be redundant. However, in accordance with the present invention, the second pair functions to minimize drift, this being accomplished by alternately uncaging a first pair of gyros, say $G_1$–$G_2$, and then uncaging the second pair $G_3$–$G_4$ while recaging the first pair. The alternate uncaging of the two pairs of gyros may be carried out by a conventional sequential switching arrangement as shown in FIG. 4, adapted to actuate alternately the two pairs of solenoid probes. The switch S may operate electronically or mechanically.

If at any given instant, it is assumed that gyros $G_1$–$G_2$ are uncaged and gyros $G_3$–$G_4$ are caged, we may consider the first active pair to be on the "duty cycle" and the second inactive pair as on the "rest cycle." Whenever the cycle time has elapsed (i.e., one second) or a relative gyro drift is detected, a cycle switch will be initiated, uncaging the rest cycle gyros and shifting platform control to them, the former duty cycle gyros being now caged and rezeroed.

It will now be demonstrated that the effect of using two or more sets of gyros does not result in a redundancy but serves to reduce a constant drift rate, which may go beyond acceptable limits even with gyros of the highest precision, to a sequence of small, random drift rates.

Let us designate the cycle time as "ΔT," the total number of cycle shifts as "N," and the inherent gyro drift rate as "D," in degrees per hour. Then the single gyro drift error will be:

$$e = D(\Delta T) N$$

On the other hand, it can be shown that drift error when two or more sets of gyros are used will be:

$$E = D(\Delta T) \sqrt{N}$$

It will be evident that the larger the value of N the better the performance of the system becomes in comparison with the very best unaided gyro now in existence. A further improvement can be realized by the use of a third pair of sensing gyros. Signal comparison may then be used to select the smallest of the three gyro drifts independently in each coordinate direction. Thus while only two sets are shown it is to be understood that a greater number may be employed in accordance with the principles underlying the invention.

In operation, shaft 16 of the inertial sphere 11 will be aligned with the earth's polar axis, herein shown when the vehicle is on the equator. Let us assume the sphere 11 is so oriented that the spin axis of gyro $G_1$ points to the first point of Aries ($\gamma$). When gyros $G_1$ and $G_2$ are uncaged to go on the duty cycle, they will then appear to rotate counter-clockwise (to the westward) at the earth rate; viz. 15° per hour to the eastward. Gyros $G_1$ and $G_2$, however, will immediately generate signals which will drive sphere 11 in a counter-clockwise direction to maintain it in alignment with the free gyros; i.e., in alignment with Aries ($\gamma$).

Assume now that the vehicle is transported to the eastward at a constant velocity. Horizontal base 14 will be rotated to the eastward in accordance with the new rate, while gyros $G_1$ and $G_2$ will remain fixed in space; but error signals will be immediately generated which will increase the rate at which sphere 11 is being rotated to the westward, thus maintaining the spin axis of gyro $G_1$ in alignment with Aries ($\gamma$).

If the redundant signals do not coincide (presumably occasioned by an individual drift), the signals will be averaged to zero and control automatically shifted to the opposite set. A tilt of base 14 about the remaining two orthogonal axes of the gimbal suspension will generate signals serving to elevate or depress shaft 16 or to rotate the entire array about the local vertical axis in a similar manner.

Figure 5:
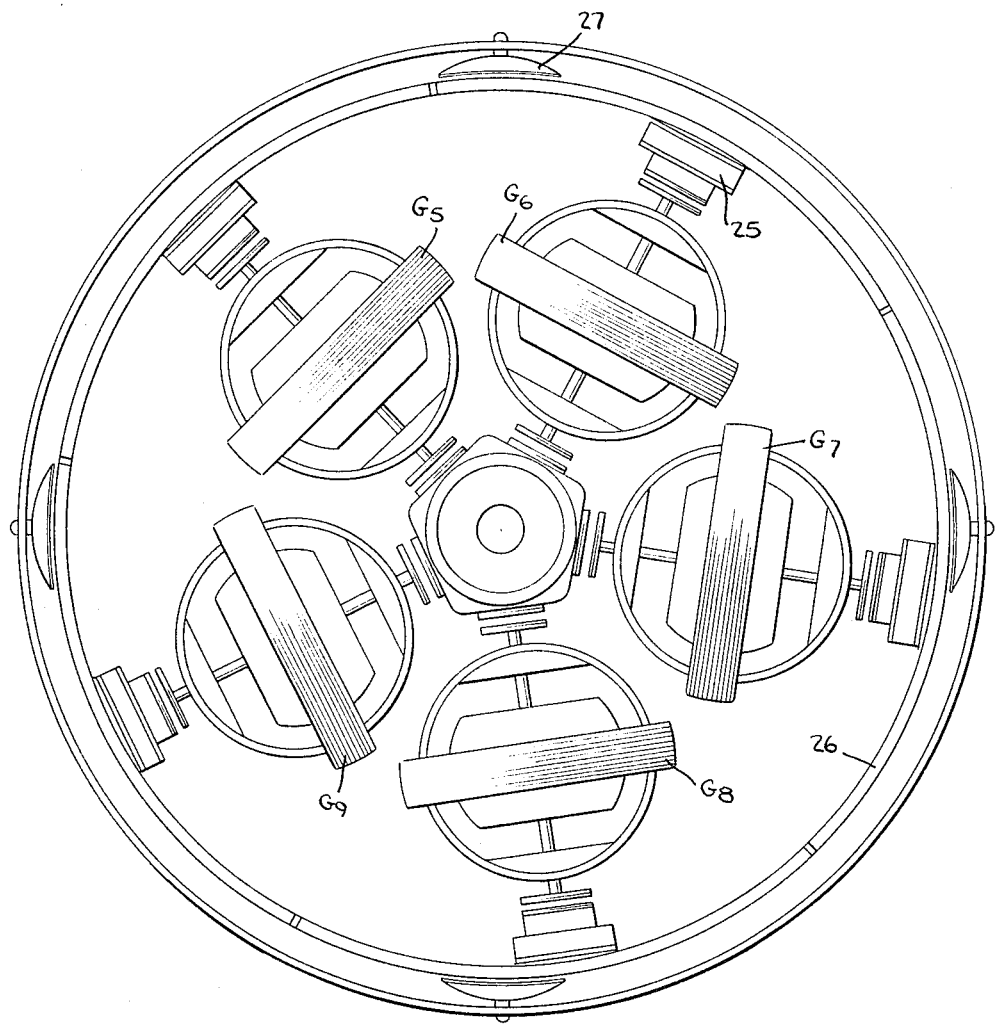
FIG. 5 is a modification of the gyro arrangement shown in FIG. 3, showing five co-planar gyros with associated commutator segments and commutator brushes.

Referring now to FIG. 5, there is shown a modified gyro arrangement in which five gyros $G_5$, $G_6$, $G_7$, $G_8$ and $G_9$ are mounted in co-planar relationship, the gyros being spaced 72° apart to minimize gimbal lock-up. Electromatic cages 25 are used, rather than mechanical cages as shown in FIGS. 2 and 3. Also included is a commutator arrangement adapted to relay appropriate "up-down" or "right-left" correction signals to the latitude, the hour angle, or the azimuth motor. The commutator is constituted by circumferentially-arranged commutator segments 26 defining a cylinder and cooperating brushes 27.

The five gyros $G_5$ to $G_9$ are operated in accordance with a predetermined cycle whereby one pair or set is uncaged and sampled, while the remaining gyros are caged momentarily but not interrogated.

At the expiration of the cycle time the latter are sampled, while the former are caged briefly. There are three brief intervals during which one gyro ($G_5$ in the case illustrated) will be midway between two brushes and no signal will be relayed from it (a null position).

To accommodate this condition, a sequential switch will conduct a sampling program about shaft 16 in the following order, where $G_5$ is A, $G_6$ is B, $G_7$ is C, $G_8$ is D and $G_9$ is E:

ABC/DE; CDE/AB; EAB/CD; BCD/EA; DEA/BC

Left-right (L/R) signals from gyros A–B–C will be amplified and sent to a gate similar to that illustrated in FIG. 4, which will pass *only* those signals which are alike (all "L" or all "R") and relay them to a conventional rate regulator to drive motor 21 (FIG. 2) in the proper direction. "Left" signals are designated plus (+) and impart to the rate regulator an incremental *increase* in rotational rate of 5 arc seconds per second (5″/sec.), while "right" signals are designated minus (−) and impart an incremental *decrease* of 4 arc seconds per second (4″/sec.). Assuming that a title of the horizontal stabilizing platform calls for an increase in the rotational rate of motor 21 from 15 to 17 arc seconds per second the following sequence will occur:

Gyros ABC, 15″/sec.+5″/sec.=20″/sec. (shift)
Gyros CDE, 20″/sec.−4″/sec.=16″/sec. (shift)
Gyros EAB, 16″/sec.+5″/sec.=21″/sec. (shift)
Gyros BCD, 21″/sec.−4″/sec.=17″/sec. (shift)

NOTE.—On-coming gyros will have practically no drift error.

If, however, three erroneous signals (occasioned by gyro drift) reach the gate simultaneously no change in rotational rate is required and the sequence will continue, thus:

Gyros DEA, 17″/sec.−4″/sec.=13″/sec. (shift)
Gyros ABC, 13″/sec.+5″/sec.=18″/sec. (shift)
Gyros CDE, 18″/sec.−4″/sec.=14″/sec. (shift)
Gyros EAB, 14″/sec.+5″/sec.=19″/sec. (shift)
Gyros BCD, 19″/sec.−4″/sec.=15″/sec. (shift)

This entire operation will be completed within a period of a few seconds and will be followed by a similar sampling of the gyros in combination for up/down errors. Thus it will be apparent that spurious signals, singly or in combination, will be accepted but that their falsity will not be inherited by the system as a whole, thereby providing an improved space platform.

It will be further apparent that highly-refined gyroscopes need not be employed by that rugged, inexpensive components less subject to failure under extreme environmental conditions will serve as well.

The cycle outlined above involves the detection and relaying of "up-down" (latitude) and "right-left" (longitude) error signals only. Errors in the rotational rate of motor 20 (FIG. 3) are preferably detected by a similar array of gyros (not shown) mounted on base 14 and spaced equidistantly about the vertical axis. This array is operated sequentially to provide true heading information.

The computer used in conjunction with the platform may be in conventional analog mechanical form or of the type disclosed in U.S. Patent 2,444,933.

*The horizontal platform*

The term "horizontal platform" has reference to an element slaved to remain perpendicular to the local earth radius, while a "level platform" refers to an element perpendicular to the local gravitational field vector. While the platform disclosed herein is technically of the latter type, it will be designated as a horizontal platform, the small discrepancy being corrected in the programmed route by setting in astronomical latitudes instead of geographic latitudes.

Referring again to the schematic shown in FIG. 1, wherein the horizontal platform is generally designated by numeral 15, it will be seen that the platform is freely suspended in a gimbal system having two degrees of freedom, one in roll and one in pitch. Vehicle yaw causes the horizontal platform to rotate, transmitting true heading information (TH) to the inertial platform 10, mounted directly above the horizontal platform.

Mounted within the inner gimbal 30 which takes the form of a cubical housing, is a stabilizing gyro constituted by a high-inertial rotor 31. Rotor 31 is spun at high speed about the axis $x$ by means of a suitable motor, the axis being aligned with the true local vertical. The rotor serves to provide a platform whose stability is relatively immune to vehicle maneuvers and turbulence. The inner gimbal 30 is rotatable within the outer gimbal 29, which is supported in bearings mounted on the frame of the vehicle.

Four integrating accelerometers 32, 33, 34 and 35 are mounted about the rotor 31 in such a manner that two of them, 32 and 34, are aligned along one axis, and the other two, 33 and 35, are aligned perpendicular to the first two. The accelerometers are attached to the inner gimbal 30 and are of conventional design.

Figure 6:
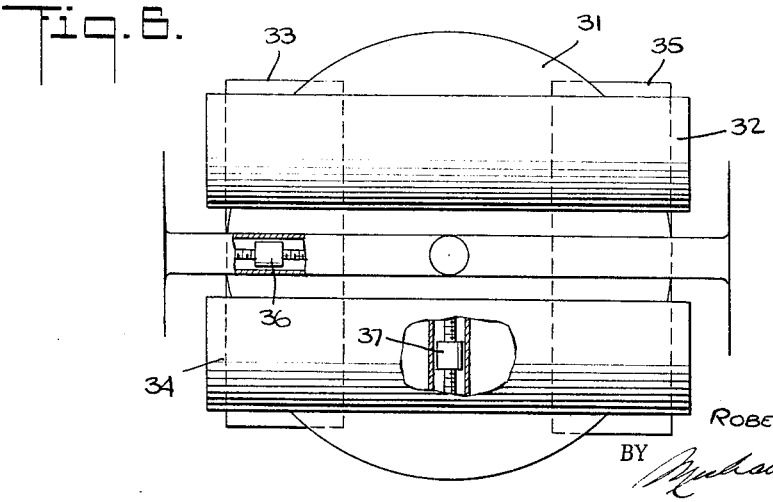
FIG. 6 is a sketch showing the arrangement of accelerometers in the horizontal platform.

In the sketch of FIG. 6, the accelerometers are again shown, but the units 32 and 34 are mounted above the rotor and units 33 and 35 below, the operation however is the same as in FIG. 1. Movable weights 36 and 37 provide means for balancing the horizontal platform in a static condition as well as for leveling the platform by supplying precessing torques to the rotor 31. The gimbals are completely free, transmitting as little of the vehicular motion as possible to the horizontal platform.

In operation, the platform is required to tilt at a varying rate of about 15°/hour in order to maintain its orientation normal to the gravitational field. An orthogonal pair (i.e., 32–33 or 34–35) of the accelerometers will detect a tilt of the platform in the manner of a sensitive spirit level, the pair generating a control signal to reposition the weights, 35 and 37, hence applying a torque to the rotor and causing it to precess in such a manner as to relevel the platform in a direction zeroing the sensed error signal and thereby rezeroing the torquing weights.

To minimize errors arising from a time-increasing accelerometer drift, alternate duty and rest cycles are used with the two sets of accelerometers, very much in the manner described in connection with the inertial platform. After the cycle time has elapsed (the specific interval will depend on the application of the system), the operative pair of accelerometers will be switched off and the other orthogonal pair will be rendered operative.

Thus by switching control frequently from one pair to another to rezero the accelerometers, accelerometer drift will be minimized and the total error will then never greatly exceed the combined threshold error and random vehicle acceleration error. The important point of this action is that the errors are prevented from accumulating.

The nature of the system used to apply vehicle corrections will depend on the nature of the vehicle and its mission. If we asume that the vehicle is given preset instructions to pass over a succession of geographic points culminating in the target, then a simple analog great circle course-to-steer computer will supply adequate course information.

Figure 7:
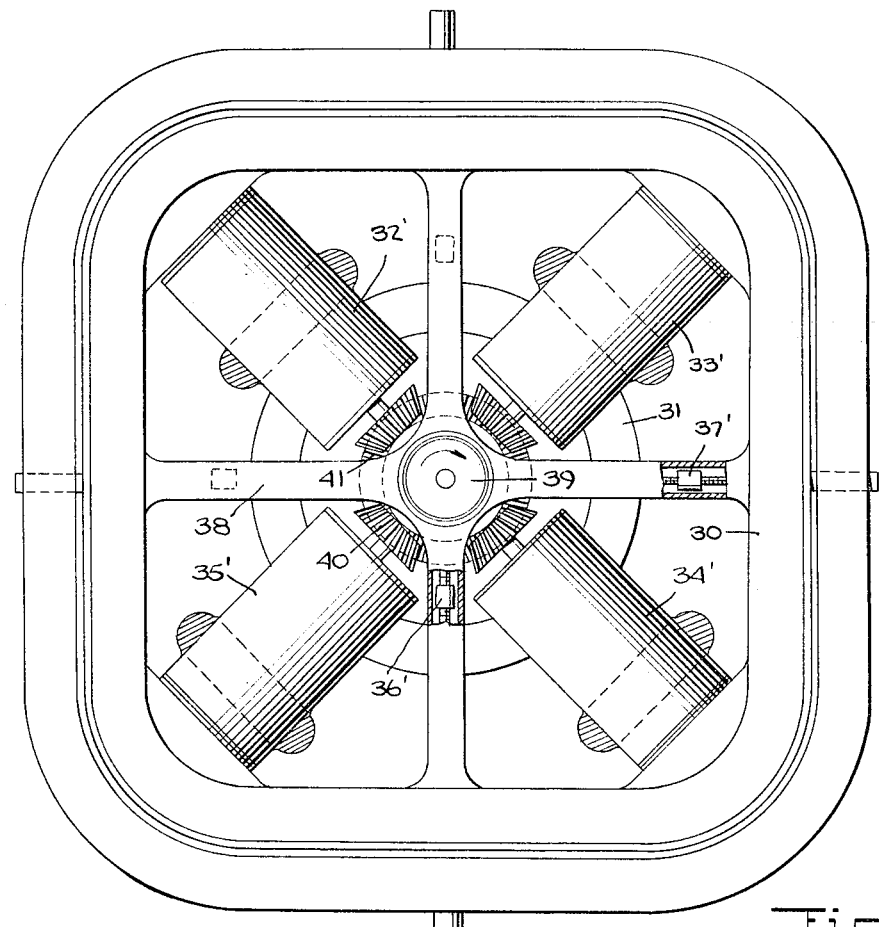
FIG. 7 is an alternate form of horizontal platform, shown in plan view.

Referring now to FIG. 7, there is shown a modified form of horizontal platform. The rotor 31 is supported within the inner gimbal 30 below the intersection of a cruciform spider 38 having hollow arms within which are adjustably-mounted the movable weights 36' and 37'. Rotor 31 is driven by a motor 39 mounted at the intersection, the motor also driving through suitable gears four radially-arranged accelerometers 32', 33', 34', and 35' of the type requiring that the sensing element be rotated at high speed. Each accelerator is provided with a pinion 40 engaging the main gear 41 keyed to the motor shaft. In this case the sensed errors must be combined algebraically before being applied to reposition the correcting weights 36' and 37'.

Thus in this arrangement two pairs of orthogonally-arranged accelerometers, or velocimeters, are provided, and a time-increasing drift is avoided by sequentially caging one pair while the other is active during the duty cycle, and then uncaging said one pair and caging the other, control of the platform being switched accordingly. In this way a time-increasing drift will not be permitted to go beyond acceptable limits.

In yet another mode the off-duty pair will be recentered, or caged, briefly and released to allow the sensing elements to respond to the existing vehicular velocity, then to "float on the line" until interrogated. Given an accelerometer whose drift rate increases exponentially with time, yet for a minute or two after uncaging is of a magnitude below that of the threshold of the sensor, a cycle time may be selected which will find each unit in a condition of zero drift and prepared to respond when sampled.

*Vehicle-control*

In operation, signals generated by the free gyro in the inertial platform will be relayed via the rate regulator and shaft positioners to maintain the sphere 11 fixed with respect to the earth's polar axis and to the meridian through the first point of Aries; i.e., fixed with reference to inertial space.

The angle made by shaft 16 relative to the horizontal is a measure of latitude while that which the local meridian makes with the meridian of Aries is a measure of the local hour angle of Aries. When this value is combined algebraically with the Greenwich hour angle of Aries, as by means of a sidereal clock associated with shaft 16 (note clock 42 in FIG. 2), the resultant is the instantaneous value of longitude.

These several angular values need not be picked-off the gimbal shafts, since error signals may be fed directly to the computer. In addition, error signals generated about the true vertical axis (TH) may be relayed to a conventional autopilot in the manner disclosed in FIG. 5 of Patent 2,444,933. Thus the vehicle may be constrained to fly automatically to a predetermined destination either directly or circuitously. The latter technique may best be accomplished by pre-computing the longitude and latitude of successive geographic positions or extracting them from a chart, then programming into the automatic pilot the successive positions to be approached.

In the case of vehicles remaining at a relatively constant flight altitude with respect to the earth's surface, a check on the orientation of the inertial platform with respect to the celestial sphere may be had whenever two or more stars are observable within the vicinity of the zenith of the vehicle. This may be accomplished, as shown in FIG. 8, through the medium of a television camera 43. The view taken is through a window in the top surface of the vehicle.

Camera 43 is mounted by gimbals 44 and 45 within a transparent earth globe 46 which is rotatably supported concentrically within a transparent star globe 47. The earth globe is slaved to the star globe by means of a sidereal clock 48. The star globe, which is supported within a Cardan suspension 49 secured to the vehicle frame, is slaved to the master inertial platform (not shown) located preferably at the center of gravity of the vehicle.

The television camera is oriented in terms of latitude and longitude, as recorded by the master system, and is therefore pointed with an adequate degree of accuracy at the zenith.

The camera is part of a closed circuit system and will photograph the stars near the zenith, as well as the images of the same stars engraved upon the inner surface of the transparent star globe. In a manned vehicle, the operator will see both the real and model images as presented on a viewing screen, and he will thereby be able to correct any mis-alignment therebetween by means of suitable signals. In doing so he will correct any mis-alignment of the terrestrial globe with respect to inertial space, but not necessarily with respect to the earth itself, for that is a function of the correctness of the horizontal platform.

Stellar monitoring need be resorted to only with a frequency dependent on the degree of accuracy desired. It is also possible to carry out the monitoring function automatically by known techniques.

In a manned vehicle the operator will be presented with a view of the terrain immediately beneath the craft, to any desired scale, as well as a view of the true and model stars. Alternatively, automatic star tracking, as disclosed in U.S. Patent 2,961,191, can be used to reorient the platform. Corrections for the effect of Coriolis acceleration upon the stable horizontal platform may be effected in the manner disclosed in U.S. Patent 2,444,933.

While there has been shown what are considered to be preferred embodiments of the invention, it will be appreciated that many changes and modifications may be made therein without departing from the essential spirit of the invention as set forth in the appended claims.

What is claimed is:

1. In an inertial guidance system, a stabilized horizontal platform comprising a platform freely suspended in a gimbal system having two degrees of freedom, one in roll and one in pitch, a stabilizing gyro mounted on said platform constituted by a high inertial rotor and motor means to effect spinning of said rotor at a relatively high speed, two sets of integrating accelerometers mounted about said rotor to detect a tilt of said platform, the accelerometers of each set being orthogonally-arranged and being subject to drift, movable weights on said platform for supplying precessing torques to said rotor, a control mechanism responsive to the operative set of accelerometers for shifting the position of said weights so as to relevel the platform, said sets being normally inoperative, and selective means sequentially to render said sets operative at periodic intervals to minimize said drift.

2. A stabilized horizontal platform, as set forth in claim 1, wherein said accelerometers include rotating sensing elements, and a motor for driving both said sensing elements and said rotor.

3. A stabilized horizontal platform, as set forth in claim 2, wherein two sets of accelerometers are provided and the accelerometers are radially arranged with respect to the axis of said rotor.

4. A horizontal platform as set forth in claim 3, wherein said means to maintain said accelerometers inoperative is constituted by means to cage said rotating sensing elements.

5. In a space-stabilized inertial platform, a sphere rotatable within a gimbal system, at least two duplicate sets of orthogonally arranged free-sensing gyros mounted within the sphere, a control mechanism responsive to the operative set of said gyros and operative on said gimbal system to adjust the position thereof to an extent acting to stabilize said sphere in space, means caging said gyros to maintain them inoperative, and selective means sequentially uncaging each set of gyros to render them operative at frequent intervals to minimize drift effects.

6. In a space-stabilized inertial platform, as set forth in claim 5, wherein said control mechanism is provided with an optical detector and each gyro is provided with a mirror to reflect a light beam from said detector to produce a signal indicative of the position of said gyro.

7. In an inertial guidance system for a vehicle having directional control means, a stabilized horizontal platform including at least two duplicate sets each set of which is constituted by accelerometers for sensing the direction of the gravitational field, said accelerometers being subject to drift, a control mechanism responsive to the operative set of said accelerometers for stabilizing said horizontal platform relative to said field, means maintaining said accelerometers inoperative, and selective means sequentially rendering each set of accelerometers operative at frequent intervals to minimize drift; a freely suspended space-stabilized inertial platform mounted on said horizontal platform and including at least two duplicate sets each set of which is constituted by free-sensing gyros, said gyros being subject to drift, a control mechanism responsive to the operative set of said gyros to stabilize said inertial platform in space, means caging said gyros to maintain them inoperative, and selective means sequentially uncaging each set of gyros to render them operative at frequent intervals to minimize drift, and means to couple said inertial and horizontal platforms to derive continuous positional data therefrom; a course-directing mechanism for said guidance system, said mechanism being coupled to the direction control means of said vehicle, and a computer for combining said positional data with programmed route information to produce heading information for said course-directing mechanism, said gyros being caged by electromagnetic probes which engage caging sockets, the probes being retracted when the electromagnet is energized.

References Cited by the Examiner

UNITED STATES PATENTS

| | | | |
|---|---|---|---|
| 2,574,762 | 11/1951 | Schell | 317—165 X |
| 2,946,539 | 7/1960 | Fischel | 244—14 |
| 2,972,892 | 2/1961 | Tiffany. | |
| 2,999,391 | 9/1961 | Freebairn et al. | |
| 3,029,647 | 4/1962 | Picardi et al. | |
| 3,055,223 | 9/1962 | Sedgfield. | |

FOREIGN PATENTS 11,040   5/1907   Great Britain.

BENJAMIN A. BORCHELT, *Primary Examiner.*

SAMUEL FEINBERG, *Examiner.*

L. L. HALLACHER, M. F. HUBLER,
*Assistant Examiners.*